United States Patent
Takagi et al.

(10) Patent No.: US 10,882,033 B2
(45) Date of Patent: Jan. 5, 2021

(54) SLURRY COMPOSITION FOR CATALYST AND METHOD FOR PRODUCING SAME, METHOD FOR PRODUCING CATALYST USING THIS SLURRY COMPOSITION FOR CATALYST, AND METHOD FOR PRODUCING CU-CONTAINING ZEOLITE

(71) Applicant: N.E. CHEMCAT Corporation, Tokyo (JP)

(72) Inventors: Yukio Takagi, Tokyo (JP); Kiyohiko Saito, Tokyo (JP); Yasuyuki Banno, Tokyo (JP); Makoto Nagata, Numazu (JP)

(73) Assignee: N.E. CHEMCAT CORPORATION, Tokyo (JP)

( * ) Notice: Subject to any disclaimer, the term of this patent is extended or adjusted under 35 U.S.C. 154(b) by 0 days.

(21) Appl. No.: 16/197,404

(22) Filed: Nov. 21, 2018

(65) Prior Publication Data

US 2019/0160455 A1 May 30, 2019

(30) Foreign Application Priority Data

Nov. 27, 2017 (JP) ................. 2017-227030

(51) Int. Cl.

| | | |
|---|---|---|
| *B01J 29/72* | (2006.01) | |
| *B01J 35/12* | (2006.01) | |
| *B01J 37/00* | (2006.01) | |
| *B01J 37/10* | (2006.01) | |
| *F01N 3/20* | (2006.01) | |
| *B01J 35/04* | (2006.01) | |
| *B01J 37/03* | (2006.01) | |
| *F01N 13/16* | (2010.01) | |
| *B01J 29/76* | (2006.01) | |
| *B01J 37/02* | (2006.01) | |
| *B01J 29/072* | (2006.01) | |
| *B01J 37/30* | (2006.01) | |
| *C01B 39/48* | (2006.01) | |

(52) U.S. Cl.
CPC ........... *B01J 29/723* (2013.01); *B01J 29/072* (2013.01); *B01J 29/763* (2013.01); *B01J 35/04* (2013.01); *B01J 35/12* (2013.01); *B01J 37/0009* (2013.01); *B01J 37/0201* (2013.01); *B01J 37/0213* (2013.01); *B01J 37/0215* (2013.01); *B01J 37/038* (2013.01); *B01J 37/10* (2013.01); *B01J 37/30* (2013.01); *F01N 3/2066* (2013.01); *F01N 13/16* (2013.01); *B01J 2229/18* (2013.01); *B01J 2229/186* (2013.01); *B01J 2229/42* (2013.01); *B01J 2229/66* (2013.01); *C01B 39/48* (2013.01); *F01N 2330/30* (2013.01); *F01N 2370/04* (2013.01); *F01N 2510/063* (2013.01); *F01N 2570/14* (2013.01)

(58) Field of Classification Search
CPC ...... B01J 29/723; B01J 29/072; B01J 29/763; B01J 2229/42; B01J 2229/66; B01J 2229/18; B01J 2229/186; B01J 35/04; B01J 35/12; B01J 37/038; B01J 37/10; B01J 37/0009; B01J 37/0201; B01J 37/0213; B01J 37/0215; B01J 37/30; C01B 39/48; F01N 3/2066; F01N 2330/06; F01N 2330/30; F01N 2370/04; F01N 2570/14; F01N 2570/145; F01N 2510/063
USPC ............................ 502/60, 63, 64, 69, 70, 76
See application file for complete search history.

(56) References Cited

U.S. PATENT DOCUMENTS

| | | | | |
|---|---|---|---|---|
| 6,080,377 A | * | 6/2000 | Deeba ................ | B01D 53/9418 423/239.2 |
| 6,150,291 A | * | 11/2000 | Deeba ................ | B01D 53/9418 502/60 |
| 6,759,358 B2 | * | 7/2004 | Huang ................ | B01J 21/12 502/64 |
| 6,849,568 B2 | * | 2/2005 | Yan ................ | B01J 29/04 428/469 |
| 7,601,662 B2 | * | 10/2009 | Bull ................ | B01J 23/8926 502/60 |
| 8,735,311 B2 | * | 5/2014 | Bull ................ | B01D 53/9418 502/60 |
| 2008/0226545 A1 | | 9/2008 | Bull et al. | |
| 2010/0290963 A1 | | 11/2010 | Andersen et al. | |
| 2011/0076229 A1 | * | 3/2011 | Trukhan ............. | B01D 53/9418 423/703 |
| 2011/0251048 A1 | | 10/2011 | Ariga et al. | |
| 2012/0028789 A1 | * | 2/2012 | Matsuo ............. | B01D 53/9418 502/74 |
| 2013/0005563 A1 | * | 1/2013 | Matsuo ............. | B01D 53/9418 502/60 |

(Continued)

FOREIGN PATENT DOCUMENTS

| | | |
|---|---|---|
| JP | 2008-521744 A | 6/2008 |
| JP | 2010-519038 A | 6/2010 |

(Continued)

*Primary Examiner* — Elizabeth D Wood
(74) *Attorney, Agent, or Firm* — Bacon & Thomas, PLLC

(57) ABSTRACT

A slurry composition for a catalyst and a method for producing the same, a catalyst and a method for producing the same using the slurry composition for a catalyst. The method omits many heretofore required treatment steps and reduces catalyst production cost. The method comprising the steps of providing a slurry composition for a catalyst, comprising at least an aluminosilicate, Cu, and water, and having a solid concentration of 0.1% by mass to 90% by mass, wherein a component for a catalyst has composition represented by $Al_2O_3 \cdot xSiO_2 \cdot yT_2O \cdot zCuO$ (wherein T is a quaternary ammonium cation, and x, y and z are numbers that satisfy $10 \leq x \leq 40$, $0.1 \leq y < 2.0$, and $0.1 \leq z < 2.0$, respectively) in terms of molar ratio based on an oxide; coating at least one side of a support with this slurry composition; and heat-treating at 350° C. or higher.

17 Claims, 1 Drawing Sheet

(56) References Cited

U.S. PATENT DOCUMENTS

| | | | | |
|---|---|---|---|---|
| 2013/0243659 A1* | 9/2013 | Sutton | ................. | B01D 53/944 |
| | | | | 422/168 |
| 2013/0280160 A1 | 10/2013 | Ariga et al. | | |
| 2014/0234206 A1* | 8/2014 | Trukhan | ............ | B01D 53/9418 |
| | | | | 423/700 |
| 2015/0133287 A1* | 5/2015 | Matsuo | ............. | B01D 53/9418 |
| | | | | 502/60 |
| 2017/0312743 A1* | 11/2017 | Casci | ................ | B01D 53/9418 |

FOREIGN PATENT DOCUMENTS

| | | |
|---|---|---|
| JP | 2010-163349 A | 7/2010 |
| JP | 2010-168269 A | 8/2010 |
| JP | 2011-102209 A | 5/2011 |
| JP | 2012-116747 A | 6/2012 |
| JP | 2012-211066 A | 11/2012 |
| JP | 2015-027673 A | 2/2015 |
| JP | 2015-196115 A | 11/2015 |
| JP | 2016-195992 A | 11/2016 |
| JP | 2016-216296 A | 12/2016 |
| WO | 2006/057760 A1 | 6/2006 |
| WO | 2010/074040 A1 | 7/2010 |
| WO | 2012/086753 A1 | 6/2012 |

* cited by examiner

SLURRY COMPOSITION FOR CATALYST AND METHOD FOR PRODUCING SAME, METHOD FOR PRODUCING CATALYST USING THIS SLURRY COMPOSITION FOR CATALYST, AND METHOD FOR PRODUCING CU-CONTAINING ZEOLITE

BACKGROUND OF THE INVENTION

Field of the Invention

The present invention relates to a slurry composition for a catalyst and a method for producing the same, a method for producing a catalyst using this slurry composition for a catalyst, and a method for producing a Cu-containing zeolite, etc.

Description of the Related Art

NOx in the atmosphere is responsible for air pollution such as photochemical smog or acid rain. Therefore, NOx discharged from the emission sources of automobiles or the like equipped with internal-combustion engine, such as a gasoline engine or a diesel engine, one of the NOx emission sources has heretofore been a social problem. Under these circumstances, much higher performance of a NOx purification system has received attention.

For example, the selective catalytic reduction (SCR) of NOx using a nitrogen compound such as ammonia or urea is used as the NOx purification system in a wide range of fields. Thermal power plants, gas turbines, coal-fired power plants, coal-fired cogeneration plants, oil refinery heaters, chemical treatment industry, furnaces, coke ovens, municipal waste disposal equipment, incineration apparatus boilers, and the like are known as SCR purposes.

In recent years, for example, a urea SCR (selective catalytic reduction) system has been in widespread use as a method for purifying NOx in diesel engine cars. In this urea SCR system, urea water is injected into an exhaust path, and urea is hydrolyzed at a high temperature to generate ammonia ($NH_3$) gas. This ammonia is adsorbed onto a SCR catalyst, and NOx is chemically reacted with the ammonia on the SCR catalyst and thereby purified into nitrogen and water.

Reduction treatment using a three-way catalyst cannot be performed for diesel engines in which an exhaust gas flow path becomes exceedingly oxygen-rich, direct gasoline-injection engines or lean burn engines at the time of stratified charge combustion, etc. Therefore, NOx storage reduction-type catalysts or lean NOx catalysts are used for the reduction treatment of NOx in these engines. These catalysts employ a noble metal such as platinum (Pt), rhodium (Rh), or palladium (Pd) as well as a NOx trapping material. NOx in exhaust gas is transiently stored in the NOx trapping material. Then, NOx is eliminated in a stoichiometric or rich state and reduced and purified.

Meanwhile, zeolites, one type of hydrous aluminosilicate, have a crystal structure having regular pores having a constant size and are widely used for various industrial purposes such as adsorbents or separating agents for various inorganic or organic molecules through the use of difference in polarity or molecular size as well as desiccants, dehydrating agents, ion exchangers, petroleum refinery catalysts, petrochemical catalysts, and solid acid catalysts. Also, the zeolites are widely used as catalyst supports and SCR catalysts as well as NOx trapping materials or the like for adsorbing nitrogen oxide (NOx) such as NO or $NO_2$.

In particular, copper (Cu)-supported zeolites having a chabazite (CHA) structure (hereinafter, also referred to as "CHA-type zeolites") have received attention as zeolites having SCR catalytic action.

The CHA-type zeolites are generally produced by hydrothermal reaction using starting materials such as a Si element source, an Al element source, and an alkali source and an organic structure directing agent such as a N,N,N-trialkyl-adamantammonium cation or a N,N,N-trialkyl-benzylammonium cation (see, for example, National Publication of International Patent Application No. 2008-521744, Japanese Patent Laid-Open No. 2010-163349, Japanese Patent Laid-Open No. 2010-168269, Japanese Patent Laid-Open No. 2011-102209, Japanese Patent Laid-Open No. 2012-116747, and Japanese Patent Laid-Open No. 2012-211066). Since the organic structure directing agent remains within the pores of the CHA-type zeolites thus synthesized, calcination treatment is further performed at a temperature on the order of 350 to 1000° C. in order to remove the organic structure directing agent.

Meanwhile, the supporting of Cu by the CHA-type zeolite is generally performed by ion-exchanging the $Na^{3O}$-type CHA-type zeolite obtained as described above to $NH_4^+$ type or $H^+$ type by ion-exchange treatment or heat treatment using an aqueous acetate solution, an aqueous nitrate solution, an aqueous sulfate solution, or the like, followed by further ion exchange using an aqueous copper nitrate solution or the like (see, for example, National Publication of International Patent Application No. 2010-519038, International Publication No. WO 2010/074040, International Publication No. WO 2012/086753, Japanese Patent Laid-Open No. 2015-027673, Japanese Patent Laid-Open No. 2015-196115, Japanese Patent Laid-Open No. 2016-195992, and Japanese Patent Laid-Open No. 2016-216296). The obtained Cu-supported CHA-type zeolite is further subjected to aging treatment or the like at a temperature on the order of 350 to 1000° C. in order to stabilize performance, for example.

The Cu-supported CHA-type zeolite thus obtained is prepared into a slurry. Then, a support such as a honeycomb structure is coated with the slurry, followed by calcination treatment at a temperature on the order of 350 to 1000° C. to obtain an integral structure-type honeycomb catalyst.

As mentioned above, the production of catalysts such as integral structure-type honeycomb catalysts requires a large number of treatment steps such as calcination treatment for the removal of an organic structure directing agent after hydrothermal synthesis of a CHA-type zeolite, solution treatment for ion exchange to $NH_4^+$ type, heat treatment for ion exchange to $H^+$ type, aging treatment for catalyst stabilization, preparation treatment of a slurry for catalyst layer formation, and calcination treatment for catalyst layer formation. Thus, its production process is complicated and produces a catalyst at relatively high cost. Furthermore, these treatments, if performed a plurality of times or for a long time, disadvantageously reduce the crystallinity of the zeolite after hydrothermal synthesis and reduce the high-temperature performance of the resulting catalyst.

The present invention has been made in light of the problems described above. An object of the present invention is to provide a slurry composition for a catalyst and a method for producing the same, and a catalyst and a method for producing the same using the slurry composition for a catalyst which are capable of omitting many heretofore required treatment steps and are thereby capable of drastically reducing catalyst production cost. Another object of the present invention is to provide a slurry composition for a catalyst and a method for producing the same which are capable of preparing a high-performance catalyst whose high-temperature performance is prevented from being deteriorated. A further alternative object of the present invention is to provide a method for producing a Cu-containing zeolite which is capable of achieving the slurry composition for a catalyst with good reproducibility and high efficiency.

Not only the objects described herein but the exertion of working effects that are derived from each configuration given in "Description of Embodiments" mentioned later and cannot be obtained by conventional techniques can also be interpreted as an alternative object of the present invention.

SUMMARY OF THE INVENTION

The present inventors have conducted diligent studies to attain the objects and consequently completed the present invention by finding that the objects can be attained by using a slurry composition for a catalyst having specific composition. Specifically, the present invention provides various specific aspects given below.

<1> A slurry composition for a catalyst, comprising at least an aluminosilicate, Cu, and water, and having a solid concentration of 0.1% by mass to 90% by mass, wherein a component for a catalyst has composition represented by $Al_2O_3 \cdot xSiO_2 \cdot yT_2O \cdot zCuO$ (wherein T is a quaternary ammonium cation, and x, y and z are numbers that satisfy $10 \leq x \leq 40$, $0.1 \leq y < 2.0$, and $0.1 \leq z < 2.0$, respectively) in terms of molar ratio based on an oxide.

<2> The slurry composition for a catalyst according to <1>, further comprising 0.1 to 40% by mass of a binder.

<3> The slurry composition for a catalyst according to <1> or <2>, wherein the T is a quaternary ammonium cation represented by the general formula $R^1N(R^2)_3$ wherein $R^1$ represents a linear, branched or cyclic hydrocarbon group having 1 or more and 12 or less carbon atoms, wherein the hydrocarbon group optionally contains a heteroatom and optionally contains a substituent, $R^2$ represents a linear or branched alkyl group having 1 or more and 4 or less carbon atoms, and a plurality of $R^2$ are the same as or different from each other.

<4> The slurry composition for a according to any one of <1> to <3>, wherein the aluminosilicate is $NH_4^+$ type.

<5> The slurry composition for a catalyst according to any one of <1> to <4>, wherein the aluminosilicate is a zeolite having a CHA-type crystal structure.

<6> A method for producing a slurry composition for a catalyst, comprising at least the steps of: providing a Cu-containing aluminosilicate; and preparing a slurry containing at least the Cu-containing aluminosilicate, an organic structure directing agent containing a quaternary ammonium cation, and water, and having a solid concentration of 0.1% by mass to 90% by mass, wherein a component for a catalyst has composition represented by $Al_2O_3 \cdot xSiO_2 \cdot yT_2O \cdot zCuO$ (wherein T is a quaternary ammonium cation, and x, y and z are numbers that satisfy $10 \leq x \leq 40$, $0.1 \leq y < 2.0$, and $0.1 \leq z < 2.0$, respectively) in terms of molar ratio based on an oxide.

<7> The method for producing a slurry composition for a catalyst according to <6>, wherein in the step of preparing a slurry, a slurry containing at least 0.1 to 89% by mass of the Cu-containing aluminosilicate, 0.1 to 40% by mass of a binder, and 10 to 90% by mass of the water is prepared.

<8> The method for producing a slurry composition for a catalyst according to <6> or <7>, wherein the T is a quaternary ammonium cation represented by the general formula $R^1N(R^2)_3$ wherein $R^1$ represents a linear, branched or cyclic hydrocarbon group having 1 or more and 12 or less carbon atoms, wherein the hydrocarbon group optionally contains a heteroatom and optionally contains a substituent, $R^2$ represents a linear or branched alkyl group having 1 or more and 4 or less carbon atoms, and a plurality of $R^2$ are the same as or different from each other.

<9> The method for producing a slurry composition for a catalyst according to any one of <6> to <8>, wherein the aluminosilicate is $NH_4^+$ type.

<10> The method for producing a slurry composition for a catalyst according to any one of <6> to <9>, wherein the aluminosilicate is a zeolite having a CHA-type crystal structure.

<11> A method for producing a catalyst, comprising at least: the step of providing a slurry composition for a catalyst according to any one of <1> to <5>; a coating step of coating at least one side of a support with the slurry composition for a catalyst; and a calcination step of heat-treating the slurry composition for a catalyst after the coating at 350° C. or higher to form a catalyst layer.

<12> The method for producing a catalyst according to <11>, wherein in the coating step, at least one side of the support is coated with the slurry composition for a catalyst in an amount of 0.1 to 500 g/L based on the composition of the slurry composition for a catalyst.

<13> A method for producing a Cu-containing zeolite, comprising at least: the step of providing a starting material composition comprising at least a Si—Al—Cu element source comprising at least a Cu-containing aluminosilicate which is an aluminosilicate having a silica-alumina ratio of 2 or more and less than 15 and contains divalent Cu at a Cu/Al ratio of 0.1 or more and less than 1.0, a Si element source (except for those corresponding to the Si—Al—Cu element source), an organic structure directing agent which contains a quaternary ammonium cation and is substantially free from polyamine, and water; and a hydrothermal treatment step of hydrothermally treating the starting material composition to synthesize a Cu-containing zeolite having composition represented by $Al_2O_3 \cdot xSiO_2 \cdot yT_2O \cdot zCuO$ (wherein T is a quaternary ammonium cation, and x, y and z are numbers that satisfy $10 \leq x \leq 40$, $0.1 \leq y < 2.0$, and $0.1 \leq z < 2.0$, respectively) in terms of molar ratio based on an oxide.

<14> The method for producing a Cu-containing zeolite according to <13>, wherein an uncalcined Cu-containing zeolite is obtained without a calcination step of performing heat treatment at 350° C. or higher in the hydrothermal treatment step or later.

<15> The method for producing a Cu-containing zeolite according to <13> or <14>, wherein the Cu-containing aluminosilicate comprises at least one selected from the group consisting of an amorphous aluminosilicate, and an aluminosilicate having a GIS structure, a FAU structure, a CHA structure, an LTL structure, a PHI structure, a MER structure, or an ERI structure as a crystal structure.

<16> The method for producing a Cu-containing zeolite according to any one of <13> to <15>, wherein the Si element source is at least one selected from the group consisting of precipitated silica, colloidal silica, fumed silica, silica gel, sodium silicate, and alkoxysilane.

<17> The method for producing a Cu-containing zeolite according to any one of <13> to <16>, wherein the starting material composition further comprises seed crystals of a CHA-type zeolite, and in the hydrothermal treatment step, the starting material composition is hydrothermally treated to synthesize a Cu-containing CHA-type zeolite.

<18> A Cu-containing zeolite obtained by hydrothermally treating a slurry composition for a catalyst, the slurry composition comprising at least an aluminosilicate, Cu, and water, and having a solid concentration of 0.1% by mass to 90% by mass, wherein a component for a catalyst has composition represented by $Al_2O_3 \cdot xSiO_2 \cdot yT_2O \cdot zCuO$ (wherein T is a quaternary ammonium cation, and x, y and z are numbers that satisfy $10 \leq x \leq 40$, $0.1 \leq y < 2.0$, and $0.1 \leq z < 2.0$, respectively) in terms of molar ratio based on an oxide.

<19> The Cu-containing zeolite according to <18>, wherein the Cu-containing zeolite has composition represented by $Al_2O_3 \cdot xSiO_2 \cdot yT_2O \cdot zCuO$ (wherein T is a quaternary ammonium cation, and x, y and z are numbers that satisfy $10 \leq x \leq 40$, $0.1 \leq y < 2.0$, and $0.1 \leq z < 2.0$, respectively) in terms of molar ratio based on an oxide.

<20> The Cu-containing zeolite according to <18> or <19>, wherein the Cu-containing zeolite has a CHA-type crystal structure.

<21> The Cu-containing zeolite according to any one of <18> to <20>, wherein the aluminosilicate is $NH_4^+$ type.

According to the present invention, a catalyst can be prepared more conveniently at lower cost than ever because many heretofore required treatment steps can be omitted. The present invention can also achieve a catalyst excellent in high-temperature performance because the crystallinity of a zeolite is prevented from being reduced by repetitively performing solution treatment or heat treatment. Furthermore, an uncalcined Cu-containing zeolite is superior in dispersibility during slurry preparation to calcined products and therefore eliminates the need of a high level of dispersion treatment, mixing treatment, milling treatment, etc. during slurry preparation. Therefore, the burden of treatment during slurry preparation can be drastically reduced.

DETAILED DESCRIPTION OF THE PREFERRED EMBODIMENTS

Hereinafter, embodiments of the present invention will be described in detail. The embodiments below are given merely for illustrating exemplary (typical) embodiments of the present invention. The present invention is not intended to be limited by them. The present invention can be carried out by arbitrarily making changes or modifications without departing from the spirit of the present invention. In the present specification, numerical values or physical property values expressed to sandwich the term "to" are used to include the values. For example, the numerical range of "1 to 100" encompasses both the upper limit value "100" and the lower limit value "1". The same holds true for the expression of other numerical ranges.

[Slurry Composition for Catalyst and Method for Producing Same]

The slurry composition for a catalyst of the present embodiment comprises at least an aluminosilicate, Cu, and water, and has a solid concentration of 0.1% by mass to 90% by mass, wherein a component for a catalyst has composition represented by $Al_2O_3 \cdot xSiO_2 \cdot yT_2O \cdot zCuO$ (wherein T is a quaternary ammonium cation, and x, y and z are numbers that satisfy $10 \leq x \leq 40$, $0.1 \leq y < 2.0$, and $0.1 \leq z < 2.0$, respectively) in terms of molar ratio based on an oxide.

Figure 1:
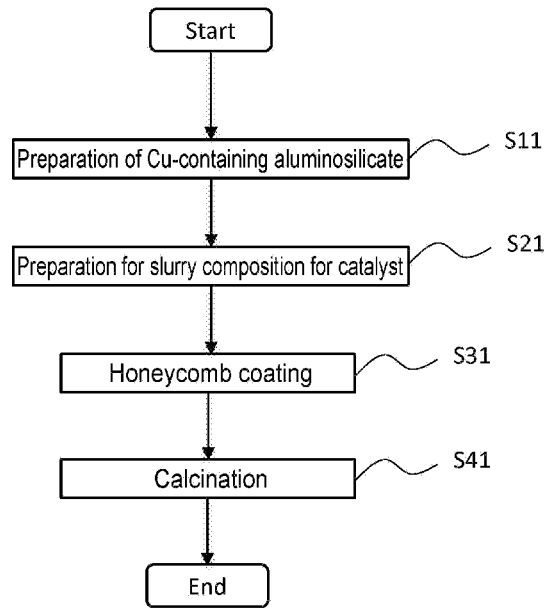
FIG. 1 is a flow chart showing a method for producing a slurry composition for a catalyst (S11 and S21) and a method for producing a catalyst (S21, S31 and S41) according to an embodiment.

As shown in FIG. 1, the slurry composition for a catalyst of the present embodiment can be obtained through the step of preparing a Cu-containing aluminosilicate (S11) and the step of preparing a slurry having specific composition (S21). Hereinafter, these steps will be described in detail.

<Step of Preparing Cu-Containing Aluminosilicate (S11)>

This preparation step (S11) involves preparing a Cu-containing aluminosilicate containing a predetermined amount of Cu. This Cu-containing aluminosilicate can be obtained, for example, by mixing an aluminosilicate and a Cu ion at a predetermined ratio, and a method for the preparation is not particularly limited. Preferred examples of the Cu-containing aluminosilicate include a Cu-containing aluminosilicate (Si—Al—Cu element source) obtained by allowing an aluminosilicate (Si—Al element source) to contain divalent Cu at a Cu/Al ratio of 0.1 or more and less than 1.0.

(Si—Al Element Source)

The Si—Al element source is not particularly limited, and an aluminosilicate having a silica-alumina ratio ($SiO_2/Al_2O_3$ molar ratio; hereinafter, also referred to as "SAR") of 2 or more and less than 15 is preferably used. An aluminosilicate having SAR of 2 or more and less than 15, known in the art can be used without particular limitations, and the type thereof is not particularly limited. The aluminosilicate can be used alone or in any combination of two or more at any ratio. In this context, the aluminosilicate has a structure where silicon atoms in a silicate are partially replaced with aluminum atoms. The silica-alumina ratio is preferably 5 or more and less than 13, more preferably 7 or more and less than 11. In the present specification, the silica-alumina ratio means a value determined by fluorescent X-ray analysis. Specifically, in the fluorescent X-ray analysis, the apparatus used was Axios (Malvern Panalytical Department, Spectris Co., Ltd.). 5 g of a measurement sample was placed in a vinyl chloride ring, pressure-formed under a load of 20 t, and subjected to measurement. The analytical software used was UniQuant 5. The % by mass of $Al_2O_3$ and $SiO_2$ was determined, and SAR was calculated from this result.

An aluminosilicate represented by the following general formula (I) is preferably used as such an aluminosilicate:

$$xM_2O \cdot Al_2O_3 \cdot mSiO_2 \cdot nH_2O \qquad (I)$$

wherein M represents an alkali metal element, x is a number that satisfies $0 \leq x \leq 0.6$, m is a number that satisfies $2 \leq m < 15$, and n is a number that satisfies $5 \leq n \leq 15$.

In the general formula (I), examples of the alkali metal element include Li, Na, Ka, Rb, and Cs. Among them, Na and K are generally used, and Na is preferred. The aluminosilicate described above may contain an additional element, for example, an element such as Ga, Fe, B, Ti, Zr, Sn, or Zn, in addition to Si and Al.

In the general formula (I), $0 \leq x \leq 0.2$ is preferred, and $0 \leq x \leq 0.1$ is more preferred.

In the general formula (I), m is preferably $5 \leq m < 13$, more preferably $7 \leq m < 11$.

In the general formula (I), n is preferably 6≤n≤15, more preferably 7≤n≤15.

Among the aluminosilicates having SAR of 2 or more and less than 15, an aluminosilicate that is in a solid powder form at ordinary temperature and pressure (25° C. and 1 atm) is preferably used from the viewpoint of handleability, dispersibility, etc. In the present specification, the powder form conceptually includes a powder (powder comprising primary particles and/or aggregates of the primary particles (secondary particles)) and granules prepared by granulating the primary particles or the secondary particles. The shape of each particle of the aluminosilicate in a powder form is not particularly limited, and, for example, any of spherical, ellipsoidal, crushed, flat, and amorphous shapes may be used.

The average particle size ($D_{50}$) of the aluminosilicate in a powder form is not particularly limited and is preferably 1 to 500 μm, more preferably 20 to 350 μm. In the present specification, the average particle size $D_{50}$ means a median size measured in a laser diffraction particle size distribution measurement apparatus (e.g., manufactured by Shimadzu Corp., laser diffraction particle size distribution measurement apparatus SALD-3100).

An aluminosilicate having an amorphous aluminosilicate, a GIS structure, a FAU structure, a CHA structure, an LTL structure, a PHI structure, a MER structure, or an ERI structure as a crystal structure determined by powder X-ray diffractometry is preferably used as the aluminosilicate having SAR of 2 or more and less than 15. In this context, the amorphous crystal structure in powder X-ray diffractometry means that clear peaks that exhibit specific plane indices are absent in an X-ray diffraction diagram. A commercially available synthetic aluminum silicate can be used as such an amorphous aluminosilicate. A database of the backbone structures of various zeolites is compiled by International Zeolite Association (hereinafter, also abbreviated to "IZA"). These structures can be identified by comparison with any of powder X-ray diffraction (hereinafter, referred to as "XRD") patterns described in Collection of simulated XRD powder patterns for zeolites, Fifth revised edition (2007) and XRD patterns described in Zeolite Framework Types of IZA Structure Commission homepage http://www.iza-structure.org/databases/.

The aluminosilicate having SAR of 2 or more and less than 15 can be synthesized by a method known in the art. For example, a water-soluble silicate and a water-soluble aluminum salt are reacted under conditions involving a ratio of a silicon atom in the water-soluble silicate to an aluminum atom in the water-soluble aluminum salt (Si/Al) of 1.0 to 5.5 (preferably 2.5 to 5.4), a liquid temperature of 20 to 90° C. (preferably 40 to 70° C.), pH of 3.8 to 5.0 (preferably 4.0 to 4.7), a reaction solution concentration ($SiO_2+Al_2O_3$) of 70 to 250 g/L (preferably 100 to 180 g/L), and a reaction format of continuous reaction. An aluminum silicate can be separated by solid-liquid separation from the obtained reaction solution, washed, and dried to obtain an aluminosilicate having SAR of 2 or more and less than 15. In this operation, aluminum chloride, aluminum nitrate, aluminum sulfate, sodium aluminate, or the like is preferably used as the water-soluble aluminum salt. Also, a silicic acid alkali metal salt such as sodium silicate or potassium silicate is preferably used as the water-soluble silicate. In this context, sodium silicate No. 1, No. 2, No. 3, or No. 4, sodium metasilicate, sodium orthosilicate, or the like is preferably used as the sodium silicate. The aluminosilicate having a silica-alumina ratio of 2 or more and less than 15 as the Si—Al element source can be used alone or in any combination of two or more at any ratio.

(Si—Al—Cu Element Source)

A Cu-containing aluminosilicate that functions as a Si—Al—Cu element source can be obtained by allowing the Si—Al element source mentioned above to contain divalent Cu. In this context, the content of Cu is preferably 0.1 or more and less than 1.0, more preferably 0.15 or more and 0.7 or less, further preferably 0.15 or more and 0.5 or less, in terms of Cu/Al ratio.

A method for allowing the Si—Al element source to contain divalent Cu is not particularly limited, and an approach known in the art can be applied thereto without particular limitations. The Cu-containing aluminosilicate can be obtained by mixing the aluminosilicate as the Si—Al element source and a Cu ion at a predetermined ratio. Specifically, the Si—Al element source mentioned above can be dipped in a divalent Cu-containing solution such as an aqueous copper(II) nitrate solution, an aqueous copper(II) sulfate solution, an aqueous copper(II) chloride solution, or an aqueous copper(II) acetate solution. In this operation, pH adjustment can be performed, if necessary, using, for example, ammonia water or NaOH. Conditions for the dipping treatment using a divalent Cu-containing solution are not particularly limited and usually preferably involve room temperature to 60° C. and 0.1 hours to 48 hours. Then, solid-liquid separation treatment, water washing treatment, drying treatment to remove water, for example, at a temperature on the order of 50 to 150° C. in the atmosphere, or the like may be performed, if necessary, according to a routine method.

(Ammonium Source)

In this context, the Si—Al source or the Si—Al—Cu element source can be ion-exchanged to a $NH_4$-type aluminosilicate in advance by the addition of ammonium ($NH_4^+$). Such ion exchange performed in advance allows a $NH_4$-type crystalline aluminosilicate (zeolite) to be obtained directly after hydrothermal treatment of the Cu-containing aluminosilicate. Examples of the ammonium source include, but are not particularly limited to, an aqueous ammonium nitrate solution and an aqueous ammonium chloride solution. The amount of the ammonium source used can be appropriately set according to the desired performance and is not particularly limited. The aluminosilicate can be converted to ammonium type using an ammonium salt corresponding to 1 to 6 times the mass of the aluminosilicate serving as the Si—Al—Cu element source.

The silica-alumina ratio of the Cu-containing aluminosilicate is not particularly limited and is preferably 2 or more and less than 15, more preferably 5 or more and less than 13, further preferably 7 or more and less than 11. The Si—Al—Cu element source preferably has a smaller content ratio of an alkali metal element Na. Specifically, the Na/Al ratio is preferably 0 or more and less than 0.1, more preferably 0.00001 or more and 0.05 or less, further preferably 0.0005 or more and 0.01 or less.

<Step of Preparing Slurry Composition for Catalyst (S21)>

This preparation step (S21) involves first mixing the Cu-containing aluminosilicate described above with an organic structure directing agent (hereinafter, also abbreviated to "OSDA") containing a quaternary ammonium cation and water, and if necessary, optional components, for example, various additives and a Si element source, to prepare a starting material composition (mixture).

(Organic Structure Directing Agent)

In this context, the organic structure directing agent used is preferably a salt of a quaternary ammonium cation.

Specific examples thereof include, but are not particularly limited to: hydroxide salts, halides, carbonates, sulfates, methyl carbonates and methyl sulfates containing an adamantanamine derivative such as N,N,N-trialkyladamantammonium as a cation; and hydroxide salts, halides, carbonates, methyl carbonates and methyl sulfates containing a benzylamine derivative such as a N,N,N-trialkylbenzylammonium ion, a cyclohexylamine derivative such as a N,N,N-trialkylcyclohexylammonium ion or a N,N,N-methyldiethylcyclohexylammonium ion, a quinuclidinol derivative such as a N-alkyl-3-quinuclidinol ion, an aminonorbornane derivative such as N,N,N-trialkylexoaminonorbornane, or an alkylamine derivative having 1 to 2 carbon atoms such as a tetramethylammonium ion, an ethyltrimethylammonium ion, a diethyldimethylammonium ion, a triethylmethylammonium ion, or a tetraethylammonium ion as a cation. The organic structure directing agent can be used alone or in any combination of two or more at any ratio.

Among them, the organic structure directing agent is preferably at least one member selected from the group consisting of N,N,N-trimethyladamantanammonium hydroxide (hereinafter, also abbreviated to "TMAdaOH"), N,N,N-trimethyladamantanammonium halide, N,N,N-trimethyladamantanammonium carbonate, N,N,N-trimethyladamantanammonium methyl carbonate, N,N,N-trimethyladamantanammonium hydrochloride, and N,N,N-trimethyladamantanammonium sulfate.

The organic structure directing agent may involve an anion that does no harm to the formation of a zeolite crystal structure. Examples of such an anion include, but are not particularly limited to, halogen ions such as $Cl^-$, $Br^-$, and $I^-$, hydroxide ions, acetates, sulfates, and carboxylates. Among them, a hydroxide ion is preferably used.

The organic structure directing agent used is preferably substantially free from polyamine from the viewpoint of, for example, not substantially eluting a copper ion into a reaction solution and suppressing copper deposition on the inside wall of a reaction container. In this context, the term "substantially free" means that the total amount of polyamine falls within the range of 0 to 1.0% by mass, more preferably 0 to 0.5% by mass, further preferably 0 to 0.3% by mass, with respect to the total amount of the organic structure directing agent.

(Water)

Tap water, RO water (reverse osmosis membrane-treated water), deionized water, distilled water, industrial water, pure water, ultrapure water, or the like can be used as the water contained in the starting material composition according to the desired performance (Si Element Source)

The starting material composition may contain, if necessary, a Si element source other than the Si—Al—Cu element source mentioned above. Such combined use of the Si—Al—Cu element source and the Si element source tends to easily yield a high-silica (i.e., a silica-alumina ratio of 15 or more and 40 or less) zeolite crystal structure while relatively maintaining the chemical bonding state of the aluminosilicate as the Si—Al element source. Examples of such a Si element source include, but are not particularly limited to, precipitated silica, colloidal silica, fumed silica, silica gel, sodium silicate (sodium metasilicate, sodium orthosilicate, sodium silicate No. 1, No. 2, No. 3, and No. 4, etc.), and alkoxysilanes such as tetraethoxysilane (TEOS) and trimethylethoxysilane (TMEOS). The Si element source can be used alone or in combination of two or more at any ratio. In this context, in the present specification, a Si element source corresponding to the Si—Al—Cu element source mentioned above is excluded from this Si element source.

(Seed Crystals of Various Zeolites)

The starting material composition mentioned above may further contain seed crystals of various aluminosilicates from the viewpoint of the promotion of crystallization of a zeolite during hydrothermal synthesis mentioned later, etc. The seed crystals blended therein tend to promote the crystallization for the desired crystal structure and to easily yield a high-quality crystalline zeolite. For example, in order to synthesize a CHA-type zeolite, crystals of a CHA-type aluminosilicate can be used as the seed crystals.

The cation type of the seed crystals is not particularly limited, and, for example, sodium type, potassium type, ammonium type, or proton type can be used. Ammonium type or proton type is desirable. The silica-alumina ratio of the seed crystals is arbitrary and is preferably equal or equivalent to the silica-alumina ratio of the starting material composition. The silica-alumina ratio of the seed crystals is preferably 5 or more and 50 or less, more preferably 8 or more and less than 40, further preferably 10 or more and less than 30, from such a viewpoint.

In this context, the particle size ($D_{50}$) of the seed crystals used is not particularly limited and is, desirably, relatively small from the viewpoint of promoting the crystallization for the desired crystal structure. The particle size is usually 0.5 nm or larger and 5 μm or smaller, preferably 1 nm or larger and 3 μm or smaller, more preferably 2 nm or larger and 1 μm or smaller. The amount of the seed crystals blended can be appropriately set according to the desired crystallinity and is not particularly limited. The amount of the seed crystals blended is preferably 0.05 to 30% by mass, more preferably 0.1 to 20% by mass, further preferably 0.5 to 10% by mass, with respect to the mass of $SiO_2$ in the starting material composition.

(Preparation of Starting Material Composition)

In the preparation of the starting material composition, wet mixing can be performed, if necessary, using various dispersers, stirrers, or kneaders known in the art, for example, a ball mill, a bead mill, a medium stirring mill, or a homogenizer. In this operation, an additive known in the art, for example, a dispersion stabilizer such as a nonionic surfactant or an anionic surfactant, a pH adjuster, or a viscosity adjuster may be blended thereinto, if necessary. The ratio of these additives used is not particularly limited and is preferably 0.01 to 20% by mass in total, more preferably 0.05 to 10% by mass in total, further preferably 0.1 to 8% by mass in total, with respect to the total amount. In the case of performing stirring, the number of rotations is usually preferably on the order of 30 to 2000 rpm, more preferably 50 to 1000 rpm.

In this context, the content of the water in the starting material composition can be appropriately set in consideration of reactivity, handleability, etc. and is not particularly limited. The water-silica ratio ($H_2O/SiO_2$ molar ratio) of the starting material composition is usually 5 or more and 100 or less, preferably 6 or more and 50 or less, more preferably 7 or more and 40 or less. When the water-silica ratio falls within the preferred range described above, there is a tendency to enhance handleability because of easy stirring during the preparation of the starting material composition or crystallization by hydrothermal synthesis and also to easily obtain high yields by suppressing the formation of by-products or impurity crystals. As for a method for blending water into the starting material composition, the water may be blended separately from each of the components mentioned above, or may be mixed in advance with these components and blended as an aqueous solution or dispersion of the components.

The silica-alumina ratio ($SiO_2/Al_2O_3$ molar ratio) of the starting material composition can also be appropriately set and is not particularly limited. The silica-alumina ratio is usually 5 or more and 50 or less, preferably 8 or more and less than 45, more preferably 10 or more and less than 40. When the silica-alumina ratio falls within the preferred range described above, there is a tendency to easily obtain closely packed crystals and to easily obtain a crystalline zeolite that is excellent in thermal endurance in a high-temperature environment or after high-temperature exposure.

On the other hand, the hydroxide ion/silica ratio ($OH^-/SiO_2$ molar ratio) of the starting material composition can also be appropriately set and is not particularly limited. The hydroxide ion/silica ratio is usually 0.10 or more and 0.90 or less, preferably 0.15 or more and 0.50 or less, more preferably 0.20 or more and 0.40 or less. When the hydroxide ion/silica ratio falls within the preferred range described above, there is a tendency to facilitate crystallization and to easily obtain a crystalline zeolite that is excellent in thermal endurance in a high-temperature environment or after high-temperature exposure.

On the other hand, the organic structure directing agent/silica ratio (organic structure directing agent/$SiO_2$ molar ratio) of the starting material composition can also be appropriately set and is not particularly limited. The organic structure directing agent/silica ratio is usually 0.05 or more and 0.40 or less, preferably 0.07 or more and 0.38 or less, more preferably 0.09 or more and 0.35 or less. When the organic structure directing agent/silica ratio falls within the preferred range described above, there is a tendency to facilitate crystallization and to easily obtain, at low cost, a crystalline zeolite that is excellent in thermal endurance in a high-temperature environment or after high-temperature exposure.

The solid concentration of the starting material composition can be appropriately set according to required performance and is not particularly limited. The solid concentration is usually 0.1% by mass to 90% by mass, preferably 5% by mass to 50% by mass, more preferably 10% by mass to 20% by mass.

(Hydrothermal Treatment of Starting Material Composition)

The starting material composition described above can be hydrothermally treated to obtain a crystallized Cu-containing aluminosilicate (i.e., a Cu-containing zeolite). This hydrothermal treatment is usually performed in a reaction container. A reaction container known in the art can be appropriately used in this hydrothermal treatment as long as the reaction container is a hermetically sealable pressure-tight container that may be used in hydrothermal synthesis. The type thereof is not particularly limited. For example, a hermetically sealable heat-resistant and pressure-tight container such as an autoclave equipped with a stirring apparatus, a heat source, a pressure gauge, and a safety valve is preferably used.

The hydrothermal treatment may be performed in a state where the starting material composition mentioned above is left standing. The hydrothermal treatment is preferably performed in a state where the starting material composition mentioned above is mixed by stirring, from the viewpoint of enhancing the homogeneity of the resulting zeolite. This operation is usually preferably performed at the number of rotations on the order of 30 to 2000 rpm, more preferably 50 to 1000 rpm.

The treatment temperature (reaction temperature) of the hydrothermal treatment is not particularly limited and is usually 100° C. or higher and 200° C. or lower, preferably 120° C. or higher and 190° C. or lower, more preferably 150° C. or higher and 180° C. or lower, from the viewpoint of the crystallinity of the resulting zeolite, cost efficiency, etc. The treatment time (reaction time) can be a time long enough for the crystallization and is not particularly limited. The treatment time is usually 1 hour or longer and 20 days or shorter, preferably 4 hours or longer and 10 days or shorter, more preferably 12 hours or longer and 8 days or shorter, from the viewpoint of the crystallinity of the resulting zeolite, cost efficiency, etc. The treatment pressure of the hydrothermal treatment is not particularly limited, and a spontaneous pressure suffices which is generated by heating the starting material composition added into the reaction container to the temperature range described above. In this respect, an inert gas such as nitrogen or argon may be introduced, if necessary, into the container.

After the hydrothermal treatment described above, a crystallized Cu-containing aluminosilicate (Cu-containing zeolite) can be obtained. In this operation, solid-liquid separation treatment, water washing treatment, drying treatment to remove water, for example, at a temperature on the order of 50 to 150° C. in the atmosphere, or the like may be performed, if necessary, according to a routine method. The atmosphere of the drying treatment may be any of atmosphere, vacuum, and an inert gas (e.g., nitrogen gas) atmosphere. Crushing treatment, classification treatment, or the like may be further performed, if necessary, before or after the drying.

(Cu-Containing Zeolite)

In this context, the resulting Cu-containing zeolite contains the organic structure directing agent within the pores, etc. In a conventional method, for example, calcination treatment at 350° C. or higher and 1000° C. or lower is performed between the removal of the organic structure directing agent and the supporting of Cu. Then, ion exchange is carried out to $NH_4^+$ type, which is then converted to $H^+$ type by recalcination, followed by the supporting of Cu and the preparation of a catalyst using the resulting Cu-containing zeolite. However, in the present embodiment, calcination treatment can be performed during the preparation of an integral structure-type honeycomb catalyst mentioned later. Therefore, none of the calcination treatment, the ion-exchange treatment, the recalcination treatment, and the Cu supporting treatment in the conventional method are required. Specifically, the Cu-containing zeolite of the present embodiment and a slurry composition for a catalyst comprising the same are obtained without the need of the calcination step of performing heat treatment at 350° C. or higher and 1000° C. or lower in the hydrothermal treatment step mentioned above or later. In other words, use as a coating solution for catalyst formation (slurry composition for a catalyst) containing the uncalcined Cu-containing zeolite and the organic structure directing agent (cationic residue of the organic structure directing agent) can omit many treatment steps heretofore required for catalyst formation and is thereby capable of drastically reducing catalyst production cost.

The composition of the Cu-containing zeolite differs depending on the starting materials used, the blending ratio thereof, etc. and is not particularly limited. The composition is preferably composition represented by $Al_2O_3 \cdot xSiO_2 \cdot yT_2O \cdot zCuO$ (wherein T is a quaternary ammonium cation, and x, y and z are numbers that satisfy $10 \leq x \leq 40$, $0.1 \leq y < 2.0$, and $0.1 \leq z < 2.0$, respectively) in terms of molar ratio based on an oxide. In the composition described above, x, y and z are not particularly limited and are preferably numbers that satisfy $12 \leq x \leq 30$, $0.2 \leq y < 1.8$, and $0.2 \leq z < 1.5$, respectively, more preferably numbers that satisfy $15 \leq x \leq 25$, $0.3 \leq y < 1.5$, and $0.3 \leq z < 1.2$, respectively.

The T has a structure corresponding to the organic structure directing agent used and is not particularly limited as long as the T is a quaternary ammonium cation derived from the organic structure directing agent (cationic residue of the organic structure directing agent). The T is preferably represented by the general formula $R^1N(R^2)_3$. In the formula, $R^1$ represents a linear, branched or cyclic hydrocarbon group having 1 or more and 12 or less carbon atoms, wherein the hydrocarbon group optionally contains a heteroatom and optionally contains a substituent, $R^2$ represents a linear or branched alkyl group having 1 or more and 4 or less carbon atoms, and a plurality of $R^2$ are the same as or different from each other. $R^1$ is particularly preferably a cyclohexyl group, an adamantyl group, a benzyl group, a quinuclidinol group, or an exoaminonorbornane group, and $R^2$ is particularly preferably a methyl group or an ethyl group, from the viewpoint of template performance as the organic structure directing agent, etc.

In this context, the Cu-containing zeolite can take ion-exchange type such as a Cu-containing $NH_4^+$-type zeolite, a Cu-containing $H^+$-type zeolite, or a Cu-containing $Na^+$-type zeolite. A Cu-containing $NH_4^+$-type zeolite is preferred from the viewpoint of catalytic activity, etc.

The crystal structure of the Cu-containing zeolite is not particularly limited and is preferably CHA type from the viewpoint of heat resistance, catalytic activity, etc. The CHA-type zeolite is a crystalline aluminosilicate having a crystal structure equivalent to chabazites classified under a structure code of CHA in IZA. This CHA-type zeolite has aluminum (Al) and silicon (Si) as main backbone metal atoms and has a structure composed of a network of these metal atoms and oxygen (O). The structure is characterized by X-ray diffraction data, as mentioned above. The particle size of the CHA-type Cu-containing zeolite can vary depending on synthesis conditions, etc. and therefore, is not particularly limited. The average particle size ($D_{50}$) thereof is preferably 0.01 μm to 500 μm, more preferably 0.02 to 20 μm, from the viewpoint of surface area, handleability, etc.

(Slurry Composition for Catalyst)

The Cu-containing zeolite mentioned above can be mixed with water at a predetermined ratio and if necessary, mixed with optional components, for example, various additives and a binder, to obtain the slurry composition for a catalyst of the present embodiment. As for the composition of the slurry composition for a catalyst of the present embodiment, preferably, the solid concentration is 0.1% by mass to 90% by mass, and a component for a catalyst has composition represented by $Al_2O_3 \cdot xSiO_2 \cdot yT_2O \cdot zCuO$ (wherein T is a quaternary ammonium cation, and x, y and z are numbers that satisfy $10 \leq x \leq 40$, $0.1 \leq y < 2.0$, and $0.1 \leq z < 2.0$, respectively) in terms of molar ratio based on an oxide.

In this context, in the composition, x, y and z are not particularly limited and are preferably numbers that satisfy $12 \leq x \leq 30$, $0.2 \leq y < 1.8$, and $0.2 \leq z < 1.5$, respectively, more preferably numbers that satisfy $15 \leq x \leq 25$, $0.3 \leq y < 1.5$, and $0.3 \leq z < 1.2$, respectively. The T is a quaternary ammonium cation derived from the organic structure directing agent (cationic residue of the organic structure directing agent). Specific examples and preferred examples thereof are as mentioned in the section of the Cu-containing zeolite so that the description will be omitted.

In the present specification, the content ratios of $Al_2O_3$, $SiO_2$, $T_2O$, and CuO mean values measured by the following methods.

The content ratios of $Al_2O_3$, $SiO_2$, and CuO were determined by fluorescent X-ray analysis. In this fluorescent X-ray analysis, the apparatus used was Axios (Malvern Panalytical Department, Spectris Co., Ltd.). 5 g of a measurement sample was placed in a vinyl chloride ring, pressure-formed under a load of 20 t, and subjected to measurement. The analytical software used was UniQuant 5.

The content ratio of $T_2O$ was determined by organic elemental analysis. In this organic elemental analysis, the apparatus used was FLASH EA 1112 Series (Thermo Fisher Scientific Inc.). 2 to 10 mg of a sample was weighed, and the carbon content was measured using 2 mg of sulfanilamide as a standard. Only the analytical value of carbon was adopted because the analytical value of hydrogen and the analytical value of nitrogen are influenced by water and starting material-derived ammonium, respectively, and thereby have a large margin of error.

The mixing ratio between the Cu-containing zeolite and the water can be appropriately set according to required performance, etc. and is not particularly limited. The mixing ratio is preferably 0.1 to 90% by mass of the Cu-containing zeolite and 10 to 99% by mass of the water, more preferably 2 to 85% by mass of the Cu-containing zeolite and 15 to 98% by mass of the water, further preferably 3 to 80% by mass of the Cu-containing zeolite and 20 to 97% by mass of the water, from the viewpoint of handleability, coatability, etc.

(Binder)

The slurry composition for a catalyst of the present embodiment may contain a binder, if necessary. The binder blended therein tends to enhance the film strength of the resulting catalyst layer, its adhesion to a support such as a honeycomb structure, etc. In this context, a binder known in the art can be used as the binder, and the type thereof is not particularly limited. Examples of the binder include, but are not particularly limited to, boehmite, colloidal alumina, alumina sol, titania sol, silica sol, and zirconia sol. Also, a soluble salt such as aluminum nitrate, aluminum acetate, titanium nitrate, titanium acetate, zirconium nitrate, or zirconium acetate can be used as the binder. In addition, an acid such as acetic acid, nitric acid, hydrochloric acid, or sulfuric acid can also be used as the binder. The binder can be used alone or in any combination of two or more at any ratio. In this context, in the present specification, a binder corresponding to the Si—Al—Cu element source or the Si element source mentioned above is excluded from this binder.

The amount of the binder used is not particularly limited and can be an amount necessary for maintaining the film strength or adhesion of a catalyst layer. Specifically, the content of the binder is preferably 0.1 to 40% by mass, more preferably 1 to 35% by mass, further preferably 2 to 30% by mass, with respect to the total amount of the slurry composition for a catalyst.

This slurry composition for a catalyst can be used as a coating solution for forming a catalyst layer by the direct coating of a support such as a honeycomb structure (coating solution for catalyst layer formation). Use thereof as a coating solution is capable of omitting a large number of treatment steps heretofore required for catalyst formation. Therefore, use as the slurry composition for a catalyst that has not undergone a calcination step of performing heat treatment at 350° C. or higher and 1000° C. or lower, in other words, a coating solution for catalyst formation (slurry composition for a catalyst) containing the uncalcined Cu-containing zeolite and the organic structure directing agent (cationic residue of the organic structure directing agent), can omit many treatment steps heretofore required for catalyst formation and is thereby capable of drastically reducing catalyst production cost.

In the preparation of the slurry composition for a catalyst, wet mixing can be performed, if necessary, using various dispersers, stirrers, or kneaders known in the art, for example, a ball mill, a bead mill, a medium stirring mill, or a homogenizer. In this operation, an additive known in the art, for example, a dispersion stabilizer such as a nonionic surfactant or an anionic surfactant, a pH adjuster, or a viscosity adjuster may be blended thereinto, if necessary. The ratio of these additives used is not particularly limited and is preferably 0.01 to 20% by mass in total, more preferably 0.05 to 10% by mass in total, further preferably 0.1 to 8% by mass in total, with respect to the total amount. In the case of performing stirring, the number of rotations is usually preferably on the order of 30 to 2000 rpm, more preferably 50 to 1000 rpm.

[Integral Structure-Type Honeycomb Catalyst and Method for Producing Same]

<Honeycomb Coating Step (S31)>

After the step of preparing a slurry composition for a catalyst (S21), at least one side of a support is coated with the slurry composition for a catalyst mentioned above. The coating layer of the slurry composition for a catalyst may be disposed on only one side of the support or may be disposed on a plurality of sides (e.g., one principal surface and the other principal surface). Alternatively, a plurality of coating layers of the slurry composition for a catalyst may be disposed on one side of the support.

In this context, the support used is not particularly limited by its type as long as the support is capable of supporting the catalyst layer formed from the slurry composition for a catalyst. Examples thereof include, but are not particularly limited to, metals, alloys, plastics, ceramics, paper, synthetic paper, nonwoven fabrics, and laminates made of combinations thereof. The shape, planar shape, thickness, etc. of the support can also be appropriately set according to a purpose, required performance, etc. A support known in the art, such as a ceramic monolith support (e.g., cordierite, silicon carbide, and silicon nitride), a metal (e.g., stainless) honeycomb support, a wire mesh support made of stainless or the like, or a knitted wire support in a steel wool form can be used, for example, for automobile exhaust gas purposes. Its shape can be selected from arbitrary shapes, for example, prismatic, cylindrical, spherical, honeycomb, and sheet shapes. These supports can be used alone or in appropriate combination of two or more. Use of a supporting member such as a honeycomb structure support as the support facilitates utilization to install the resulting catalyst in gas stream.

The size of the support such as a honeycomb structure support can be appropriately set according to a purpose and required performance and is not particularly limited. For example, a support having a diameter (length) of several mm or several cm can be used. In the support such as a honeycomb structure support, the number of holes as openings can be appropriately set in consideration of the type of exhaust gas to be treated, the amount of gas stream, pressure loss or removal efficiency, etc. The cell density thereof is not particularly limited and is usually preferably 100 to 900 cells/inch$^2$ (15.5 to 139.5 cells/cm$^2$), more preferably 200 to 600 cells/inch$^2$ (31 to 93 cells/cm$^2$), from the viewpoint of, for example, maintaining a high surface area against gas stream and suppressing increase in pressure loss. The cell density means the number of cells per unit area at the cross section of the support such as a honeycomb structure support cut perpendicularly to a gas flow path.

A flow through-type structure which communicates with a gas flow path, and a wall flow-type structure in which a partial end face of a gas flow path is plugged and a gas is capable of flowing through the wall surface of the gas flow path are widely known as honeycomb structure supports for automobile exhaust gas purposes. Any of these structures are applicable to the present embodiment. A flow through-type structure having less resistance to air and less pressure loss of exhaust gas is preferably used.

A method for applying the slurry composition for a catalyst to the support can be performed according to a routine method and is not particularly limited. Various coating methods, wash coat methods, and zone coat methods known in the art can be applied thereto.

The amount of the slurry composition for a catalyst used in the coating (covering) can be appropriately set according to required performance and is not particularly limited. The amount is preferably 0.1 to 500 g/L, more preferably 10 to 400 g/L, further preferably 20 to 300 g/L, based on the composition of the slurry composition for a catalyst mentioned above (based on the Cu-containing zeolite) from the viewpoint of NOx adsorption performance or catalyst performance and the balance of pressure loss, etc.

A platinum group metal (PGM) such as platinum, palladium, rhodium, or iridium or a transition metal such as Cu, Fe, W, or Ce may be blended, if necessary, into the slurry composition for a catalyst and supported by the Cu-containing zeolite. A supporting method therefor is not particularly limited, and an approach known in the art can be applied thereto. For example, a salt solution containing a platinum group element or a transition metal element is prepared. The slurry composition for a catalyst can be impregnated with this salt-containing solution, followed by calcination to support the platinum group element or the transition metal element. The platinum group element or the transition metal element can be supplied as, for example, an aqueous nitrate solution, a dinitrodiammine nitrate solution, an aqueous chloride solution, a sulfate, a nitrate, an acetate, a chloride, an oxide, a complex oxide, or a complex salt, though not particularly limited thereto.

The slurry composition for a catalyst after the coating can be dried under reduced pressure using a vacuum dryer or the like according to a routine method before the subsequent calcination step. The drying treatment can be performed at approximately 50° C. to 200° C. for approximately 1 to 48 hours.

<Calcination Step (S41)>

This step involves heat-treating the slurry composition for a catalyst used in the coating of at least one side of the support at 350° C. or higher to form a catalyst layer. This produces a catalyst member having a laminated structure having at least the support and the catalyst layer disposed on at least one side of this support (integral structure-type honeycomb catalyst). In this context, in the present specification, the phrase "disposed on at least one side of the support" means to encompass an aspect in which an arbitrary additional layer (e.g., a primer layer and an adhesive layer) intervenes between the surface on the one side of the support and the catalyst layer. Specifically, in the present specification, the phrase "disposed on one side" is used in the meaning including both an aspect in which the support and the catalyst layer are in direct contact, and an aspect in which the support and the catalyst layer are placed with space via an arbitrary additional layer. This phrase means that the catalyst layer may be disposed on only one side of the support or may be disposed on a plurality of sides (e.g., one principal surface and the other principal surface). In this respect, exhaust gas purification can be performed with high efficiency by using the support such as a honeycomb structure support, installing this integral structure-type honeycomb catalyst within a flow path through which gas stream passes, and allowing gas stream to pass through the cells of the honeycomb structure support.

In this respect, the calcination temperature (treatment temperature) can be appropriately set according to the starting materials used, etc. and is not particularly limited. The calcination temperature is usually 300° C. or higher and 1000° C. or lower, preferably 400° C. or higher and 900° C. or lower, more preferably 430° C. or higher and 800° C. or lower, further preferably 450° C. or higher and 750° C. or lower, from the viewpoint of, for example, maintaining crystallinity while reducing the residual rates of the organic structure directing agent, etc. The calcination treatment is preferably performed in an oxygen-containing atmosphere and can be performed, for example, in the atmosphere. Heating means is not particularly limited, and, for example, heating means known in the art such as an electric furnace or a gas furnace can be used.

The treatment time in the calcination treatment (calcination time) can be appropriately set according to the treatment temperature and cost efficiency, etc. and is not particularly limited. The treatment time is usually 0.1 hours or longer and 72 hours or shorter, preferably 0.2 hours or longer and 48 hours or shorter, more preferably 0.5 hours or longer and 40 hours or shorter.

In the integral structure-type honeycomb catalyst, the layer configuration of the catalyst layer may be any of a single layer and multiple layers. For automobile exhaust gas purposes, the catalyst layer preferably has a two-layer or more laminated structure to enhance catalyst performance, in consideration of the trends of increased regulation of exhaust gas. In this respect, the amount of the catalyst layer mentioned above, used in the covering is not particularly limited and is preferably 0.1 to 500 g/L, more preferably 10 to 400 g/L, further preferably 20 to 300 g/L, based on the solid content of the Cu-containing zeolite from the viewpoint of catalyst performance and the balance of pressure loss, etc.

[Purpose]

The integral structure-type honeycomb catalyst thus obtained can be used as, for example, a catalyst for exhaust gas purification which purifies exhaust gas from diesel automobiles, gasoline automobiles, jet engines, boilers, gas turbines, or the like and in particular, is suitably used as a selective catalytic reduction catalyst (SCR catalyst) using a reducing agent such as ammonia, urea, or organic amines. In this respect, a conventional technique or means known in the art for SCR catalysts, for example, a catalyst species, a promoter species, the blending ratio of each component, or a catalyst laminated structure, can also be applied to the integral structure-type catalyst mentioned above. Examples of the materials for the selective catalytic reduction catalyst include various inorganic materials such as zeolite and compounds analogous to zeolite (crystalline metal aluminophosphate) as well as transition metal oxides such as vanadium oxide, titania, zirconia, and tungsten oxide, rare earth oxides such as ceria, lanthanum oxide, praseodymium oxide, samarium oxide, gadolinium oxide, and neodymium oxide, base metal oxides such as copper oxide, iron oxide, gallium oxide, and tin oxide, and complex oxides thereof. Further examples thereof include alumina, silica, and mixtures and composites of alumina or silica modified with a rare earth, an alkali metal, an alkaline earth metal, or the like, and the oxides described above. Further examples thereof include inorganic materials containing a base metal such as copper or iron ion-exchanged to zeolite, a compound analogous to zeolite, or the like.

For particularly suitable automobile exhaust gas purposes, the integral structure-type honeycomb catalyst mentioned above can be placed in the exhaust systems of various engines. The number and position of the integral structure-type honeycomb catalyst to be installed can be appropriately designed according to the regulation of exhaust gas. For example, under strict regulation of exhaust gas, the integral structure-type honeycomb catalyst can be placed at two or more positions, which can be underfloor positions immediately below the exhaust system and in the rear of the catalyst. The integral structure-type honeycomb catalyst of the present embodiment is capable of omitting many heretofore required treatment steps and can be prepared at lower cost than ever. In addition, the crystallinity of a zeolite is prevented from being reduced by repetitively performing solution treatment or heat treatment. Therefore, the integral structure-type honeycomb catalyst of the present embodiment can exert an excellent effect on the purification reaction of CO, HC, and NOx even in a high-temperature environment.

In the integral structure-type honeycomb catalyst of the present embodiment, the catalyst layer is formed by merely coating the support with the slurry composition for a catalyst and then performing heat treatment (calcination treatment) only once at 350° C. or higher. Therefore, the production process is very simplified as compared with conventional production processes in which high-temperature heat treatment is performed a plurality of times such as the removal of an organic structure directing agent, heat treatment after ion exchange, aging treatment for performance stabilization, and calcination treatment for catalyst layer formation. As a result, the integral structure-type honeycomb catalyst can be produced at very low cost. This can drastically reduce the number or the total treatment time of high-temperature heat treatment and also suppresses reduction in the high-temperature performance of a catalyst in association with reduction in the crystallinity of a zeolite after hydrothermal synthesis. The integral structure-type honeycomb catalyst is capable of maintaining a high rate of nitrogen oxide reduction, for example, even in a high-temperature range of 400° C. or higher and 600° C. or lower.

EXAMPLES

Hereinafter, the features of the present invention will be described further specifically with reference to Test Examples, Examples, and Comparative Examples. However, the present invention is not intended to be limited by them by any means. Specifically, materials, amounts used, ratios, treatment contents, treatment procedures, etc. given below in Examples can be appropriately changed or modified without departing from the spirit of the present invention. Various production conditions or values of evaluation results in Examples below mean the preferred upper limit values or the preferred lower limit values in the embodiments of the present invention. Preferred ranges may be ranges defined by the combinations of the upper limit or lower limit values described above with values of Examples described below, or the combinations of the values of Examples.

Synthesis Example 1

<Preparation of Starting Material Composition>

174.9 g of 28% ammonia water (Wako Pure Chemical Industries, Ltd., special grade) and 1026.9 g of pure water were mixed by stirring, and 217.7 g of an aqueous solution containing 50% copper nitrate dihydrate (manufactured by Kansai Catalyst Co., Ltd., 16.5% based on CuO) was added in small portions thereto to obtain 1419.5 g of a tetraamminecopper(II) nitrate solution.

Next, 1000.0 g of an amorphous synthetic aluminum silicate in a solid powder form (manufactured by Kyowa Chemical Industry Co., Ltd., synthetic aluminum silicate, trade name: KYOWAAD(R) 700SEN-S, silica-alumina ratio: 9.1, Na/Al=0.05) was added into a solution containing 1000.0 g of ammonium nitrate (manufactured by Wako Pure Chemical Industries, Ltd., first grade) dissolved in 10 L of water, and the mixture was stirred overnight at ordinary temperature. After filtration and washing, the solid was dried at 120° C. to obtain a low-Na (Na/Al=0.001) aluminosilicate.

350.0 g of this low-Na aluminosilicate was added into a preliminarily prepared mixed solution of 1,100.0 g of the tetraamminecopper(II) nitrate solution and 300.0 g of water, and the mixture was stirred overnight at room temperature. After filtration and washing, the solid was dried at 120° C. to obtain a $NH_4^+$-type copper-containing aluminosilicate of Synthesis Example 1. As a result of conducting fluorescent X-ray analysis, the $NH_4^+$-type copper-containing aluminosilicate had a silica-alumina ratio of 10.2 and Cu/Al of 0.36.

To 910.0 g of an aqueous solution containing 25% N,N,N-trimethyladamantammonium hydroxide (hereinafter, referred to as a "TMAdaOH 25% aqueous solution"; manufactured by SACHEM, Inc.), 90.0 g of pure water, 140.0 g of the $NH_4^+$-type copper-containing aluminosilicate of Synthesis Example 1 as the Si—Al—Cu element source, 5.0 g of H-type chabazite seed crystals (silica-alumina ratio: 27), and 285.0 g of colloidal silica (manufactured by Nissan Chemical Corp., trade name: SNOWTEX N-40, $SiO_2$: 39.7%) as the Si element source were added, and the mixture was thoroughly mixed to obtain a starting material composition (mixture) of Synthesis Example 1. The composition of a component for a catalyst in the obtained starting material composition was $SiO_2 \cdot 0.045 Al_2O_3 \cdot 0.303 TMAdaOH \cdot 0.032 CuO \cdot 15.2 H_2O$ (solid concentration of the starting material composition: 16.7% by mass) calculated from the composition of the charged starting materials.

The starting material composition of Synthesis Example 1 was added into a 1,200 cc stainless autoclave, which was then hermetically sealed. Then, the starting material composition was heated to 160° C. with rotation at 300 rpm and kept for 144 hours. The product after this hydrothermal treatment was separated by solid-liquid separation. The obtained solid phase was washed with a sufficient amount of water and dried at 105° C. to obtain a product of Synthesis Example 1. As a result of conducting powder X-ray diffractometry, the obtained product was confirmed to be a pure chabazite-type zeolite, i.e., a single phase of a copper-containing CHA-type zeolite. As a result of conducting organic elemental analysis, fluorescent X-ray analysis and heating loss analysis, the composition of the copper-containing CHA-type zeolite of Synthesis Example 1 was $Al_2O_3 \cdot 20.4 SiO_2 \cdot 1.04 (TMAda)_2O \cdot 0.66 CuO \cdot 5.2 H_2O$ in terms of molar ratio based on an oxide.

In the fluorescent X-ray analysis, the apparatus used was Axios (Malvern Panalytical Department, Spectris Co., Ltd.). 5 g of a measurement sample was placed in a vinyl chloride ring, pressure-formed under a load of 20 t, and subjected to measurement. The analytical software used was UniQuant 5.

In the organic elemental analysis, the apparatus used was FLASH EA 1112 Series (Thermo Fisher Scientific Inc.). 2 to 10 mg of a sample was weighed, and the carbon content was measured using 2 mg of sulfanilamide as a standard. Only the analytical value of carbon was adopted because the analytical value of hydrogen and the analytical value of nitrogen are influenced by water and starting material-derived ammonium, respectively, and thereby have a large margin of error.

Meanwhile, in the heating loss analysis, 5 g of a measurement sample was calcined at 1000° C. for 2 hours or longer and cooled to within a temperature range of 250 to 350° C. The mass at this time was measured, and the rate of heating loss was determined according to the following expression from the difference from the initial mass:

(Rate of heating loss)=[(Initial mass)−(Mass after heating)]/(Initial mass)

Meanwhile, in the powder X-ray diffractometry, the apparatus used was X'Pert Pro (manufactured by Spectris Co., Ltd.). A powder measurement sample was filled into a grooved glass sample plate container and subjected to measurement. The measurement was performed at a tube voltage of 45 kV and a tube current of 40 mA using CuKα ray as an X-ray source.

<Preparation of Slurry Composition for Catalyst>

191 g of the copper-containing CHA-type zeolite of Synthesis Example 1 was dispersed in 66.7 g of water. To the dispersion, 1.1 g of boehmite (manufactured by Sasol Ltd., trade name: Disperal P3) and 93 g of colloidal alumina (manufactured by Taki Chemical Co., Ltd., trade name: Biral Al-L7, $Al_2O_3$: 7%) were added as binders, and the mixture was well stirred to obtain a slurry composition for a catalyst of Synthesis Example 1 containing 52% by mass of the copper-containing CHA-type zeolite of Synthesis Example 1 (total solid concentration of slurry: 42% by mass).

Example 1

<Preparation of Integral Structure-Type Honeycomb Catalyst>

A cylindrical honeycomb structure (diameter: 25.4 mm, length: 50 mm) as a support was wet-coated with the slurry composition for a catalyst of Synthesis Example 1, followed by drying at 120° C. to form a coating layer containing the copper-containing CHA-type zeolite on the honeycomb structure. The amount of the slurry composition for a catalyst used in this coating was set to 235 g/L in terms of supporting ratio of the copper-containing CHA-type zeolite per L of the honeycomb structure.

Then, the integral structure-type honeycomb catalyst was calcined at 500° C. so that the coating layer was prepared into a catalyst and formed as a catalyst layer to obtain an integral structure-type honeycomb catalyst of Example 1 having a catalyst layer containing the copper-containing CHA-type zeolite on the honeycomb structure. In the integral structure-type honeycomb catalyst of Example 1, the amount (solid content) of the copper-containing CHA-type zeolite (corresponding to composition represented by $Al_2O_3 \cdot 20.4 SiO_2 \cdot 0.66 CuO$ in terms of molar ratio based on an oxide) supported per L of the honeycomb structure was 180 g/L.

[Measurement of Rate of NOx Purification]

Figure 2:
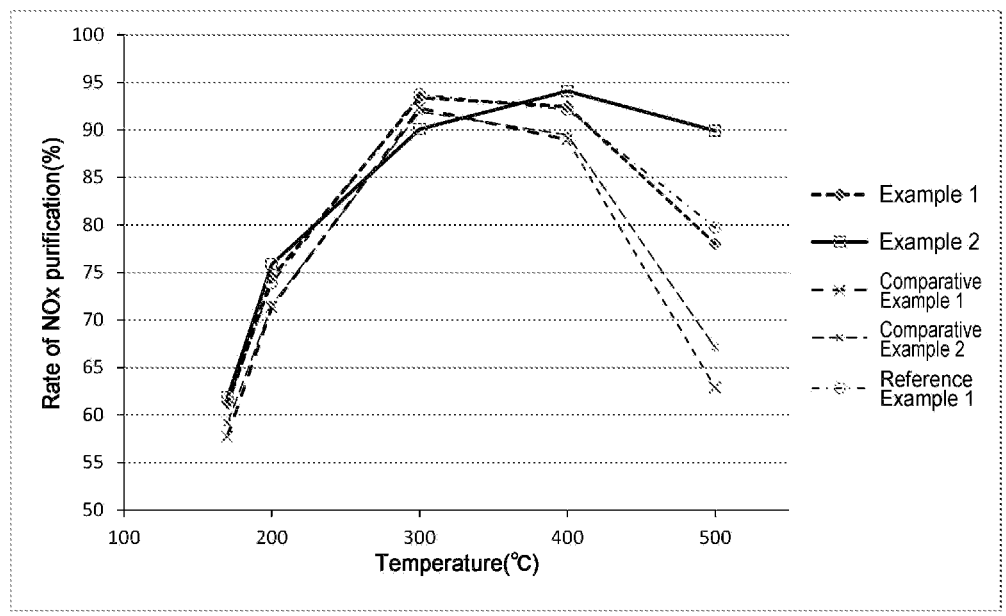
FIG. 2 is a graph showing results of measuring the rate of NOx purification in Examples 1 and 2, Comparative Examples 1 and 2 and Reference Example 1.

The integral structure-type honeycomb catalyst of Example 1 was loaded in a catalyst evaluation apparatus (trade name: SIGU-2000, manufactured by HORIBA, Ltd.), and the nitrogen oxide reduction efficiency was measured in the steady stream of model gas (gas mixture) having composition of 210 ppm of NO, 40 ppm of $NO_2$, 250 ppm of $NH_3$, 4% $H_2O$, 10% $O_2$, and a balance of $N_2$. The measurement was performed in a temperature range of 170° C. to 500° C. at a space velocity of SV=59,000 $h^{-1}$. The gas analysis was conducted using an automobile exhaust gas measurement apparatus (trade name: MEXA-6000FT, manufactured by HORIBA, Ltd.). FIG. 2 shows the results of measuring the rate of NOx purification.

Synthesis Example 2

<Preparation of Starting Material Composition>

To 170 g of $NH_4$-type zeolite P (manufactured by N.E. Chemcat Corp., silica-alumina ratio: 3.4), 850 g of an aqueous solution containing 50% copper nitrate dihydrate (manufactured by Kansai Catalyst Co., Ltd., 16.5% based on CuO) was added in small portions, and the mixture was stirred overnight at room temperature. After solid-liquid separation by centrifugation, 850 g of an aqueous solution containing 50% copper nitrate dihydrate (manufactured by Kansai Catalyst Co., Ltd., 16.5% based on CuO) was added again in small portions to the solid-phase portion, and the mixture was stirred overnight at room temperature. After solid-liquid separation by centrifugation, the solid phase was washed with water and dried at 120° C. to obtain a $NH_4^+$-type copper-containing aluminosilicate of Synthesis Example 2 having a GIS structure. As a result of conducting fluorescent X-ray analysis, the $NH_4^+$-type copper-containing aluminosilicate had a silica-alumina ratio of 3.6 and Cu/Al of 0.36.

To 630.0 g of a TMAdaOH 25% aqueous solution (manufactured by SACHEM, Inc.), 190.0 g of an aqueous solution containing 20% ethyltrimethylammonium hydroxide (hereinafter, referred to as an "ETMAOH 20% aqueous solution"; manufactured by SACHEM, Inc.), 70.0 g of pure water, 77.0 g of the $NH_4^+$-type copper-containing aluminosilicate of Synthesis Example 2 having a GIS structure as the Si—Al—Cu element source, 5.0 g of H-type chabazite seed crystals (silica-alumina ratio: 27), and 440.0 g of colloidal silica (manufactured by Nissan Chemical Corp., trade name: SNOWTEX N-40, $SiO_2$: 39.7%) as the Si element source were added, and the mixture was thoroughly mixed to obtain a starting material composition (mixture) of Synthesis Example 2. The composition of a component for a catalyst in the obtained starting material composition was $SiO_2 \cdot 0.048Al_2O_3 \cdot 0.207TMAdaOH \cdot 0.100ETMAOH \cdot 0.034CuO:15.1H_2O$ (solid concentration of the starting material composition: 17.2% by mass) in terms of molar ratio based on an oxide calculated from the composition of the charged starting materials.

The starting material composition of Synthesis Example 2 was added into a 1,200 cc stainless autoclave, which was then hermetically sealed. Then, the starting material composition was heated to 160° C. with rotation at 300 rpm and kept for 144 hours. The product after this hydrothermal treatment was separated by solid-liquid separation. The obtained solid phase was washed with a sufficient amount of water and dried at 105° C. to obtain a product of Synthesis Example 2. As a result of conducting powder X-ray diffractometry, the obtained product was confirmed to be a pure chabazite-type zeolite, i.e., a single phase of a copper-containing CHA-type zeolite. As a result of conducting organic elemental analysis, fluorescent X-ray analysis and heating loss analysis, the composition of the copper-containing CHA-type zeolite of Synthesis Example 2 was $Al_2O_3 \cdot 19.4SiO_2 \cdot 0.69$ to $0.86$ $(TMAda)_2O \cdot 0.57CuO \cdot 0$ to $0.91$ $(ETMA)_2O \cdot 0.0$ to $5.8H_2O$ in terms of molar ratio based on an oxide.

<Preparation of Slurry Composition for Catalyst>

120 g of the copper-containing CHA-type zeolite of Synthesis Example 2 was dispersed in 72.2 g of water. To the dispersion, 0.9 g of boehmite (manufactured by Sasol Ltd., trade name: Disperal P3) and 69 g of colloidal alumina (manufactured by Taki Chemical Co., Ltd., trade name: Biral Al-L7, $Al_2O_3$: 7%) were added as binders, and the mixture was well stirred to obtain a slurry composition for a catalyst of Synthesis Example 2 containing 43 to 46% by mass of the copper-containing CHA-type zeolite of Synthesis Example 2 (total solid concentration of slurry: 36% by mass).

Example 2

<Preparation of Integral Structure-Type Honeycomb Catalyst>

A cylindrical honeycomb structure (diameter: 25.4 mm, length: 50 mm) as a support was wet-coated with the slurry composition for a catalyst of Synthesis Example 2, followed by drying at 120° C. to form a coating layer containing the copper-containing CHA-type zeolite on the honeycomb structure. The amount of the slurry composition for a catalyst used in this coating was set to 228 to 242 g/L in terms of supporting ratio of the copper-containing CHA-type zeolite per L of the honeycomb structure.

Then, the integral structure-type honeycomb catalyst was calcined at 500° C. so that the coating layer was prepared into a catalyst and formed as a catalyst layer to obtain an integral structure-type honeycomb catalyst of Example 2 having a catalyst layer containing the copper-containing CHA-type zeolite on the honeycomb structure. In the integral structure-type honeycomb catalyst of Example 2, the amount (solid content) of the copper-containing CHA-type zeolite (corresponding to composition represented by $Al_2O_3 \cdot 19.4SiO_2 \cdot 0.57CuO$ in terms of molar ratio) supported per L of the honeycomb structure was 180 g/L.

[Measurement of Rate of NOx Purification]

The nitrogen oxide reduction efficiency of the integral structure-type honeycomb catalyst of Example 2 was measured in the same way as in Example 1. The results of measuring the rate of NOx purification are shown in FIG. 2.

Comparative Synthesis Example 1

<Preparation of Starting Material Composition and Zeolite>

To 330.0 g of a TMAdaOH 25% aqueous solution, 2,800 g of pure water, 45.0 g of sodium aluminate (manufactured by Wako Pure Chemical Industries, Ltd.) as the Al source and the alkali metal source, 220.0 g of precipitated silica (manufactured by Tosoh Silica Corp., trade name: Nipsil(R) ER) as the Si element source, 60.0 g of Sodium Silicate J3 (manufactured by Nippon Chemical Industrial Co., Ltd., $SiO_2$ content: 29% by mass, $Na_2O$ content: 9.5% by mass) as the Si element source and the alkali metal source, and 20 g of chabazite seed crystals (silica-alumina ratio: 13) were added, and the mixture was thoroughly mixed to obtain a starting material composition of Comparative Synthesis Example 1. The composition of the obtained starting material composition was $SiO_2 \cdot 0.065Al_2O_3 \cdot 0.104TMAdaOH \cdot 0.100Na_2O \cdot 44.4H_2O$ in terms of molar ratio based on an oxide calculated from the composition of the charged starting materials.

The obtained starting material composition of Comparative Synthesis Example 1 was added into a 5,000 cc stainless autoclave, which was then hermetically sealed. Then, the starting material composition was heated to 160° C. with rotation at 300 rpm and kept for 48 hours. The product after this hydrothermal treatment was separated by solid-liquid separation. The obtained solid phase was washed with a sufficient amount of water and dried at 105° C. to obtain a product of Comparative Synthesis Example 1. As a result of conducting powder X-ray diffractometry, the obtained product was confirmed to be a pure chabazite-type zeolite, i.e., a single phase of a CHA-type zeolite. As a result of conducting fluorescent X-ray analysis, the CHA-type zeolite of Comparative Synthesis Example 1 had a silica-alumina ratio of 13.4.

<Calcination and Ammonium-Type Ion-Exchange>

The CHA-type zeolite of Comparative Synthesis Example 1 was calcined at 600° C., then ion-exchanged three repetitive times using an aqueous ammonium nitrate solution containing ammonium nitrate in the same amount thereas and a 10-fold amount of water, then washed with a sufficient amount of pure water, and dried at 120° C. to obtain $NH^{4+}$-type CHA-type zeolite of Comparative Synthesis Example 1.

<Supporting of Copper>

160 g of the $NH^{4+}$-type CHA-type zeolite of Comparative Synthesis Example 1 was impregnated with 84 g of an aqueous solution containing 25% copper nitrate trihydrate and then calcined at 500° C. to obtain a copper-supported CHA-type zeolite of Comparative Synthesis Example 1. As a result of conducting fluorescent X-ray analysis and heating loss analysis, the composition of the copper-supported CHA-type zeolite of Comparative Synthesis Example 1 was $Al_2O_3 \cdot 13.4SiO_2 \cdot 0.72CuO \cdot 6.5H_2O$.

<Preparation of Slurry Composition for Catalyst>

155 g of the copper-supported CHA-type zeolite of Comparative Synthesis Example 1 was dispersed in 76.2 g of water. To the dispersion, 1.0 g of boehmite (manufactured by Sasol Ltd., trade name: Disperal P3) and 89 g of colloidal alumina (manufactured by Taki Chemical Co., Ltd., trade name: Biral Al-L7, $Al_2O_3$: 7%) were added as binders, and the mixture was well stirred to obtain a slurry composition for a catalyst of Comparative Synthesis Example 1 (total solid concentration of slurry: 45% by mass). This slurry composition for a catalyst contained 43% by mass, with respect to the whole slurry, of a copper-supported CHA-type zeolite in which the component for a catalyst had composition represented by $Al_2O_3 \cdot 13.4SiO_2 \cdot y(TMAda)_2O \cdot 0.72CuO$ wherein y was substantially 0, in terms of molar ratio based on an oxide.

Comparative Example 1

<Preparation of Integral Structure-Type Honeycomb Catalyst>

An integral structure-type honeycomb catalyst of Comparative Example 1 having a catalyst layer containing the copper-supported CHA-type zeolite on the honeycomb structure was obtained in the same way as in Example 1 except that the slurry composition for a catalyst of Comparative Synthesis Example 1 was used instead of the slurry composition for a catalyst of Synthesis Example 1. In the integral structure-type honeycomb catalyst of Comparative Example 1, the amount (solid content) of the copper-supported CHA-type zeolite (represented by $Al_2O_3 \cdot 13.4SiO_2 \cdot y(TMAda)_2O \cdot 0.72CuO$ wherein y was substantially 0) supported per L of the honeycomb structure was 180 g/L.

[Measurement of Rate of NOx Purification]

The nitrogen oxide reduction efficiency of the integral structure-type honeycomb catalyst of Comparative Example 1 was measured in the same way as in Example 1. The results of measuring the rate of NOx purification are shown in FIG. 2.

Comparative Synthesis Example 2

<Preparation of Starting Material Composition and Zeolite>

To 560.0 g of a TMAdaOH 25% aqueous solution, 3,7352 g of pure water, 109.0 g of Sodium Silicate J3 (manufactured by Nippon Chemical Industrial Co., Ltd., $SiO_2$ content: 29% by mass, $Na_2O$ content: 9.5% by mass) as the Si element source and the alkali metal source, 52.0 g of sodium aluminate (manufactured by Wako Pure Chemical Industries, Ltd.) as the Al source and the alkali metal source, 305.0 g of Nipsil ER (manufactured by Tosoh Silica Corp., precipitated silica) as the Si element source, and 10 g of chabazite seed crystals (silica-alumina ratio: 15) were added, and the mixture was thoroughly mixed to obtain a starting material composition (mixture) of Comparative Synthesis Example 2. The composition of a component for a catalyst in the obtained starting material composition was $SiO_2 \cdot 0.053Al_2O_3 \cdot 0.123TMAdaOH \cdot 0.095Na_2O \cdot 44.0H_2O$ in terms of molar ratio based on an oxide calculated from the composition of the charged starting materials.

A 4,085 g aliquot corresponding to 85% by mass was collected from the obtained starting material composition of Comparative Synthesis Example 2 and added into a 5,000 cc stainless autoclave, which was then hermetically sealed. Then, the starting material composition was heated to 160° C. with rotation at 300 rpm and kept for 96 hours. The product after this hydrothermal treatment was separated by solid-liquid separation. The obtained solid phase was washed with a sufficient amount of water and dried at 105° C. to obtain a product of Comparative Synthesis Example 2. As a result of conducting powder X-ray diffractometry, the obtained product was confirmed to be a pure chabazite-type zeolite, i.e., a single phase of a CHA-type zeolite. As a result of conducting fluorescent X-ray analysis, the CHA-type zeolite of Comparative Synthesis Example 2 had a silica-alumina ratio of 16.3.

<Calcination and Ammonium-Type Ion Exchange>

Calcination treatment and ion-exchange treatment were performed in the same way as in Comparative Synthesis Example 1 except that the CHA-type zeolite of Comparative Synthesis Example 2 was used instead of the CHA-type zeolite of Comparative Synthesis Example 1, to obtain a $NH^{4+}$-type CHA-type zeolite of Comparative Synthesis Example 2.

<Supporting of copper>

160 g of the $NH^{4+}$-type CHA-type zeolite of Comparative Synthesis Example 2 was impregnated with 84 g of an aqueous solution containing 25% copper nitrate trihydrate and then calcined at 500° C. to obtain a copper-supported CHA-type zeolite of Comparative Synthesis Example 2. As a result of conducting fluorescent X-ray analysis and heating loss analysis, the composition of the copper-supported CHA-type zeolite of Comparative Synthesis Example 2 was $Al_2O_3 \cdot 16.3SiO_2 \cdot 0.69CuO \cdot 9.0H_2O$.

<Preparation of Slurry Composition for Catalyst>

155 g of the copper-supported CHA-type zeolite of Comparative Synthesis Example 2 was dispersed in 76.2 g of water. To the dispersion, 1.0 g of boehmite (manufactured by Sasol Ltd., trade name: Disperal P3) and 89 g of colloidal alumina (manufactured by Taki Chemical Co., Ltd., trade name: Biral Al-L7, $Al_2O_3$: 7%) were added as binders, and the mixture was well stirred to obtain a slurry composition for a catalyst of Comparative Synthesis Example 2 (total solid concentration of slurry: 44% by mass). This slurry composition for a catalyst contained 42% by mass (solid content) of a copper-supported CHA-type zeolite represented by $Al_2O_3 \cdot 16.3SiO_2 \cdot y(TMAda)_2O \cdot 0.69CuO$ in terms of molar ratio based on an oxide wherein y was substantially 0, with respect to the whole slurry.

Comparative Example 2

<Preparation of Integral Structure-Type Honeycomb Catalyst>

An integral structure-type honeycomb catalyst of Comparative Example 2 having a catalyst layer containing the copper-supported CHA-type zeolite on the honeycomb structure was obtained in the same way as in Example 1 except that the slurry composition for a catalyst of Comparative Synthesis Example 2 was used instead of the slurry composition for a catalyst of Synthesis Example 1. In the integral structure-type honeycomb catalyst of Comparative Example 2, the amount of the copper-supported CHA-type zeolite (represented by $Al_2O_3 \cdot 16.3SiO_2 \cdot y(TMAda)_2O \cdot 0.69CuO$ wherein y was substantially 0) supported per L of the honeycomb structure was 180 g/L.

[Measurement of Rate of NOx Purification]

The nitrogen oxide reduction efficiency of the integral structure-type honeycomb catalyst of Comparative Example 2 was measured in the same way as in Example 1. The results of measuring the rate of NOx purification are shown in FIG. 2.

Synthesis Example 3

<Preparation of Cu-Containing Aluminosilicate>

To 100 g of $NH_4$-type zeolite P (manufactured by N.E. Chemcat Corp., silica-alumina ratio: 3.4), 500 g of an aqueous solution containing 50% copper nitrate dihydrate (manufactured by Kansai Catalyst Co., Ltd., 16.5% based on CuO) was added in small portions, and the mixture was stirred at 40° C. for 3 hours. After solid-liquid separation by centrifugation, 500 g of an aqueous solution containing 50% copper nitrate dihydrate (manufactured by Kansai Catalyst Co., Ltd., 16.5% based on CuO) was added again in small portions to the solid-phase portion, and the mixture was stirred at 40° C. for 3 hours. After solid-liquid separation by centrifugation, the solid phase was washed with water and dried at 120° C. to obtain a $NH_4^+$-type copper-containing aluminosilicate of Synthesis Example 3 having a GIS structure. As a result of conducting fluorescent X-ray analysis, the $NH_4^+$-type copper-containing aluminosilicate had a silica-alumina ratio of 3.6 and Cu/Al of 0.40.

<Preparation of Starting Material Composition>

To 920.0 g of a TMAdaOH 25% aqueous solution (manufactured by SACHEM, Inc.), 20.0 g of pure water, 95.0 g of the $NH_4^+$-type copper-containing aluminosilicate of Synthesis Example 3 having a GIS structure as the Si—Al—Cu element source, 5.0 g of H-type chabazite seed crystals (silica-alumina ratio: 27), and 420.0 g of colloidal silica (manufactured by Nissan Chemical Corp., trade name: SNOWTEX N-40, $SiO_2$: 39.7%) as the Si element source were added, and the mixture was thoroughly mixed to obtain a starting material composition (mixture) of Synthesis Example 3. The composition of a component for a catalyst from the obtained starting material composition was $SiO_2 \cdot 0.058Al_2O_3 \cdot 0.303TMAdaOH \cdot 0.046CuO:15.2H_2O$ (solid concentration of the starting material composition: 17.2% by mass) calculated from the composition of the charged starting materials.

<Preparation of Cu-Containing Uncalcined Zeolite>

The starting material composition of Synthesis Example 3 was added into a 1,200 cc stainless autoclave, which was then hermetically sealed. Then, the starting material composition was heated to 160° C. with rotation at 300 rpm and kept for 144 hours. The product after this hydrothermal treatment was separated by solid-liquid separation. The obtained solid phase was washed with a sufficient amount of water and dried at 105° C. to obtain a product of Synthesis Example 3. As a result of conducting powder X-ray diffractometry, the obtained product was confirmed to be a pure chabazite-type zeolite, i.e., a single phase of a copper-containing CHA-type zeolite. As a result of conducting organic elemental analysis, fluorescent X-ray analysis and heating loss analysis, the composition of the copper-containing CHA-type zeolite of Synthesis Example 3 was $Al_2O_3 \cdot 15.1SiO_2 \cdot 0.77(TMAda)_2O \cdot 0.78CuO \cdot 6.4H_2O$ in terms of molar ratio based on an oxide.

Comparative Synthesis Example 3

<Preparation of Calcined Cu-Containing Zeolite>

Subsequently, the copper-containing CHA-type zeolite of Synthesis Example 3 was calcined at 600° C. to obtain a product (calcined Cu-containing zeolite) of Comparative Synthesis Example 3. As a result of conducting fluorescent X-ray analysis and heating loss analysis, the composition of the calcined copper-supported CHA-type zeolite of Comparative Synthesis Example 3 was $Al_2O_3 \cdot 15.1SiO_2 \cdot 0.78CuO \cdot 8.1H_2O$.

<Preparation of Slurry Composition for Catalyst>

155 g of the calcined copper-supported CHA-type zeolite of Comparative Synthesis Example 3 was dispersed in 76.2 g of water. To the dispersion, 1.0 g of boehmite (manufactured by Sasol Ltd., trade name: Disperal P3) and 89 g of colloidal alumina (manufactured by Taki Chemical Co., Ltd., trade name: Biral Al-L7, $Al_2O_3$: 7%) were added as binders, and the mixture was well stirred to obtain a slurry composition for a catalyst of Comparative Synthesis Example 3 (total solid concentration of slurry: 45% by mass). This slurry composition for a catalyst contained 43% by mass of the calcined copper-supported CHA-type zeolite having composition represented by $Al_2O_3 \cdot 15.1SiO_2 \cdot y(TMAda)_2O \cdot 0.78CuO$ in terms of molar ratio based on an oxide wherein y was substantially 0, with respect to the whole slurry.

Reference Example 1

<Preparation of Integral Structure-Type Honeycomb Catalyst>

An integral structure-type honeycomb catalyst of Reference Example 1 having a catalyst layer containing the copper-supported CHA-type zeolite on the honeycomb structure was obtained in the same way as in Example 1 except that the slurry composition for a catalyst of Comparative Synthesis Example 3 was used instead of the slurry composition for a catalyst of Synthesis Example 1. In the integral structure-type honeycomb catalyst of Reference Example 1, the amount of the copper-supported CHA-type zeolite (represented by $Al_2O_3 \cdot 15.1SiO_2 \cdot y(TMAda)_2O \cdot 0.78CuO$ wherein y was substantially 0) supported per L of the honeycomb structure was 180 g/L.

[Measurement of Rate of NOx Purification]

The nitrogen oxide reduction efficiency of the integral structure-type honeycomb catalyst of Reference Example 1 was measured in the same way as in Example 1. The results of measuring the rate of NOx purification are shown in FIG. 2.

As is evident from FIG. 2, the catalysts of Examples 1 and 2 maintained high catalyst performance even in a high-temperature range of 400° C. or higher and 600° C. or lower, as compared with the catalysts of Comparative Examples 1 and 2 prepared by repetitively performing solution treatment or heat treatment. This suggests that the catalyst obtained by the production method of the present invention suppresses reduction in the crystallinity of the zeolite. Furthermore, the production method of the present invention can prepare an integral structure-type honeycomb catalyst by only 3 processes, the preparation of a starting material composition, the preparation of a slurry composition for a catalyst, and the preparation of an integral structure-type honeycomb catalyst, and can therefore drastically reduce production cost because of its drastically simplified production process, as compared with conventional methods.

As is also evident, the slurry composition for a catalyst prepared in Example 2 had catalyst performance equivalent to the already calcined catalyst of Reference Example 1. This supports the theory that the production method of the present invention can prepare a catalyst having catalyst performance equivalent to conventional catalysts even though its production process is drastically simplified as compared with conventional methods. The simplified production process is found to reduce the cost required for the resulting catalyst.

The slurry composition for a catalyst of the present invention and the method for producing the same, and the catalyst and the method for producing the same using the slurry composition for a catalyst, etc. are capable of omitting many heretofore required treatment steps and capable of drastically reducing catalyst production cost, without largely impairing catalyst performance. Thus, such a catalyst having higher performance can be used widely and effectively as, for example, a catalyst for exhaust gas purification which purifies exhaust gas from diesel automobiles, gasoline automobiles, jet engines, boilers, gas turbines, or the like. In particular, the catalyst of the present invention has higher catalyst performance in a high-temperature range of 400° C. or higher, and as such, can be especially effectively used as a SCR catalyst or the like which purifies exhaust gas from diesel automobiles, gasoline automobiles, jet engines, boilers, gas turbines, or the like which are exposed to a severe use environment.

What is claimed is:

1. A slurry composition for a catalyst, comprising at least an uncalcined Cu-containing aluminosilicate, an organic structure directing agent including a quarternary ammonium cation, and water, and having a solid concentration of 0.1% by mass to 90% by mass, wherein the slurry composition contains a component for the catalyst, said component having a composition represented by $Al_2O_3 \cdot xSiO_2 \cdot yT_2O \cdot zCuO$ wherein T is a quaternary ammonium cation derived from the organic structure directing agent, and x, y and z are numbers that satisfy $10 \leq x \leq 40$, $0.1 \leq y < 2.0$, and $0.1 \leq z < 2.0$, respectively, in terms of molar ratio based on an oxide.

2. The slurry composition for a catalyst according to claim 1, further comprising 0.1 to 40% by mass of a binder.

3. The slurry composition for a catalyst according to claim 1, wherein the T is a quaternary ammonium cation represented by the general formula $R^1N(R^2)_3$ wherein $R^1$ represents a linear, branched or cyclic hydrocarbon group having 1 or more and 12 or less carbon atoms, wherein the hydrocarbon group optionally contains a heteroatom and optionally contains a substituent, $R^2$ represents a linear or branched alkyl group having 1 or more and 4 or less carbon atoms, and a plurality of $R^2$ are the same as or different from each other.

4. The slurry composition for a catalyst according to claim 1, wherein the uncalcined Cu-containing aluminosilicate is $NH_4^+$ form.

5. The slurry composition for a catalyst according to claim 1, wherein the uncalcined Cu-containing aluminosilicate is a zeolite having a CHA-type crystal structure.

6. A method for producing a slurry composition for a catalyst, comprising at least the steps of:
providing an uncalcined Cu-containing aluminosilicate, an organic structure directing agent, and water; and
preparing a slurry having a solid concentration of 0.1% by mass to 90% by mass by mixing at least the Cu-containing aluminosilicate, the organic structure directing agent containing a quaternary ammonium cation, and the water, wherein a component for the catalyst has a composition represented by $Al_2O_3 \cdot xSiO_2 \cdot yT_2O \cdot zCuO$ wherein T is a quaternary ammonium cation, and x, y and z are numbers that satisfy $10 \leq x \leq 40$, $0.1 \leq y < 2.0$, and $0.1 \leq z < 2.0$, respectively, in terms of molar ratio based on an oxide.

7. The method for producing a slurry composition for a catalyst according to claim 6, wherein in the step of preparing a slurry, a slurry containing at least 0.1 to 89% by mass of the Cu-containing aluminosilicate, 0.1 to 40% by mass of a binder, and 10 to 90% by mass of the water is prepared.

8. The method for producing a slurry composition for a catalyst according to claim 6, wherein the T is a quaternary ammonium cation represented by the general formula $R^1N(R^2)_3$ wherein $R^1$ represents a linear, branched or cyclic hydrocarbon group having 1 or more and 12 or less carbon atoms, wherein the hydrocarbon group optionally contains a heteroatom and optionally contains a substituent, $R^2$ represents a linear or branched alkyl group having 1 or more and 4 or less carbon atoms, and a plurality of $R^2$ are the same as or different from each other.

9. The method for producing a slurry composition for a catalyst according to claim 6, wherein the aluminosilicate is $NH_4^+$ form.

10. The method for producing a slurry composition for a catalyst according to claim 6, wherein the aluminosilicate is a zeolite having a CHA-type crystal structure.

11. A method for producing a catalyst, comprising at least:
the step of providing a slurry composition for a catalyst according to claim 1;
a coating step of coating at least one side of a support with the slurry composition for a catalyst; and
a calcination step of heat-treating the slurry composition for a catalyst after the coating at 350° C. or higher to form a catalyst layer.

12. The method for producing a catalyst according to claim 11, wherein in the coating step, the support is coated with the slurry composition in an amount of 0.1 to 500 g/L based on the solid content of a Cu-containing zeolite.

13. A method for producing a Cu-containing zeolite, comprising at least:
providing a starting material composition comprising at least a Si—Al—Cu element source comprising at least an uncalcined Cu-containing aluminosilicate which has a silica-alumina ratio of 2 or more and less than 15 and contains divalent Cu at a Cu/Al ratio of 0.1 or more and less than 1.0, a Si element source exclusive of those corresponding to the Si—Al—Cu element source, an organic structure directing agent which contains a quaternary ammonium cation and is substantially free from polyamine, and water; and
hydrothermally treating the starting material composition to synthesize a Cu-containing zeolite having composition represented by $Al_2O_3 \cdot xSiO_2 \cdot yT_2O \cdot zCuO$ wherein T is a quaternary ammonium cation, and x, y and z are numbers that satisfy $10 \leq x \leq 40$, $0.1 \leq y < 2.0$, and $0.1 \leq z < 2.0$, respectively, in terms of molar ratio based on an oxide.

14. The method for producing a Cu-containing zeolite according to claim 13, wherein
an uncalcined Cu-containing zeolite is obtained without a calcination step of performing heat treatment at 350° C. or higher in the hydrothermal treatment step or later.

15. The method for producing a Cu-containing zeolite according to claim 13, wherein
the Cu-containing aluminosilicate comprises at least one selected from the group consisting of an amorphous aluminosilicate, and an aluminosilicate having a GIS structure, a FAU structure, a CHA structure, an LTL structure, a PHI structure, a MER structure, or an ERI structure as a crystal structure.

16. The method for producing a Cu-containing zeolite according to claim 13, wherein
the Si element source is at least one selected from the group consisting of precipitated silica, colloidal silica, fumed silica, silica gel, sodium silicate, and alkoxysilane.

17. The method for producing a Cu-containing zeolite according to claim 13, wherein
the starting material composition further comprises a seed crystal of a CHA-type zeolite, and
in the hydrothermal treatment step, the starting material composition is hydrothermally treated to synthesize a Cu-containing CHA-type zeolite.

* * * * *